(12) United States Patent
Hausmann

(10) Patent No.: US 10,302,216 B2
(45) Date of Patent: May 28, 2019

(54) EXTRACTION VALVE

(71) Applicants: Daimler AG, Stuttgart (DE); Nissan Motor Co., Ltd., Yokohama-shi, Kanagawa (JP)

(72) Inventor: Philipp Hausmann, Kirchheim (DE)

(73) Assignees: Daimler AG, Stuttgart (DE); Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/572,453

(22) PCT Filed: Apr. 30, 2016

(86) PCT No.: PCT/EP2016/000706
§ 371 (c)(1),
(2) Date: Nov. 7, 2017

(87) PCT Pub. No.: WO2016/180519
PCT Pub. Date: Nov. 17, 2016

(65) Prior Publication Data
US 2018/0149285 A1  May 31, 2018

(30) Foreign Application Priority Data

May 8, 2015 (DE) .................. 10 2015 005 977

(51) Int. Cl.
*F16K 31/02* (2006.01)
*F16K 31/40* (2006.01)
*F16K 1/32* (2006.01)
*F16K 25/04* (2006.01)
*F16K 31/06* (2006.01)
*F16K 1/42* (2006.01)
(Continued)

(52) U.S. Cl.
CPC .............. *F16K 31/408* (2013.01); *F16K 1/32* (2013.01); *F16K 1/42* (2013.01); *F16K 1/46* (2013.01);
(Continued)

(58) Field of Classification Search
CPC ............... F16K 31/408; F16K 31/0655; F16K 31/0675; F16K 25/04; F16K 1/32;
(Continued)

(56) References Cited

U.S. PATENT DOCUMENTS 5,048,790 A * 9/1991 Wells .................... F16K 31/408
251/30.04
6,481,452 B2 * 11/2002 Reuter .................... B60T 8/363
137/14
(Continued)

FOREIGN PATENT DOCUMENTS

DE 10 2013 019 879 A1 5/2015
EP 1 682 801 B1 7/2006
(Continued)

OTHER PUBLICATIONS

PCT/EP2016/000706, International Search Report dated Jul. 25, 2016 (Two (2) pages).
(Continued)

*Primary Examiner* — Minh Q Le
(74) *Attorney, Agent, or Firm* — Crowell & Moring LLP

(57) ABSTRACT

An extraction valve for overpressurized gas flowing from a compressed gas reservoir is disclosed. The extraction valve has a valve seat carrier, including a conical valve seat emerging centrally into an outflow chamber. An extraction piston, which is mobile in its axial direction at least indirectly via an electromagnetic coil, includes a valve body cooperating with the valve seat. An inflow chamber for the pressurized gas is designed totally or partially on the circumference of a central axis of the extraction piston and is connected in the axial direction of the extraction piston against a flow direction of the gas when the extraction piston is in the open position, between the valve seat and the valve body via an intermediate connection with an intermediate
(Continued)

volume which includes a connection with the region in which the valve seat and the valve body co-operate.

19 Claims, 4 Drawing Sheets

(51) Int. Cl.
    *F16K 1/46*     (2006.01)
    *F02M 21/02*     (2006.01)
    *H01M 8/04223*     (2016.01)

(52) U.S. Cl.
    CPC .......... *F16K 25/04* (2013.01); *F16K 31/0655* (2013.01); *F16K 31/0675* (2013.01); *F02M 21/023* (2013.01); *F02M 21/0206* (2013.01); *H01M 8/04231* (2013.01); *H01M 2250/20* (2013.01); *Y02T 90/32* (2013.01)

(58) Field of Classification Search
    CPC ......... F16K 1/42; F16K 1/46; F02M 21/0206; F02M 21/023; H01M 8/04231; H01M 2250/20; Y02T 90/32
    USPC ...... 137/487.5, 613, 601.14, 601.21, 505.25; 251/129.15
    See application file for complete search history.

(56) References Cited

U.S. PATENT DOCUMENTS

| | | | |
|---|---|---|---|
| 6,557,821 B2* | 5/2003 | Girouard | F16K 1/302 251/30.01 |
| 6,691,729 B2* | 2/2004 | Takeda | F16K 1/305 137/601.14 |
| 7,722,009 B2 | 5/2010 | Perthel et al. | |
| 7,730,905 B2* | 6/2010 | Suzuki | F17C 13/04 137/613 |
| 8,382,063 B2* | 2/2013 | Watanabe | F16K 31/0655 137/315.03 |
| 9,347,580 B2* | 5/2016 | Ninomiya | F16K 31/0675 |
| 9,879,787 B2* | 1/2018 | Hausmann | F16K 1/302 |
| 10,161,360 B2* | 12/2018 | Ninomiya | F02M 21/0233 |
| 2003/0066836 A1* | 4/2003 | Sakaguchi | F17O 1/06 220/581 |
| 2003/0151018 A1 | 8/2003 | Teshima et al. | |
| 2014/0145101 A1* | 5/2014 | Ishibashi | F02M 21/0239 251/129.15 |
| 2014/0166915 A1* | 6/2014 | Ishibashi | F02M 21/0239 251/129.15 |
| 2016/0208954 A1* | 7/2016 | Ito | F16K 31/0665 |

FOREIGN PATENT DOCUMENTS

| | | |
|---|---|---|
| JP | 2003-240148 A | 8/2003 |
| JP | 2014-105755 A | 6/2014 |
| JP | 2015-152165 A | 8/2015 |
| WO | WO 2005/040654 A2 | 5/2005 |

OTHER PUBLICATIONS

Japanese Notification of Reason for Refusal issued in Japanese counterpart application No. 2017-556987 dated Oct. 23, 2018, with partial English translation (Eight (8) pages).

* cited by examiner

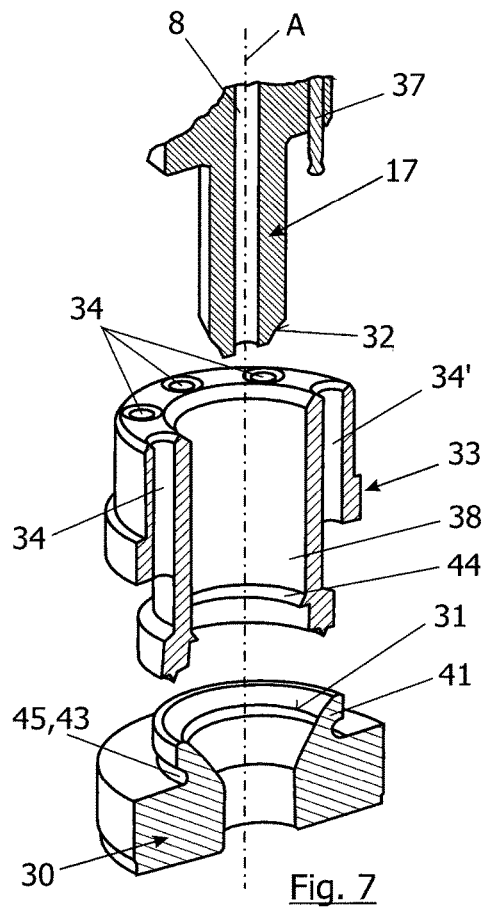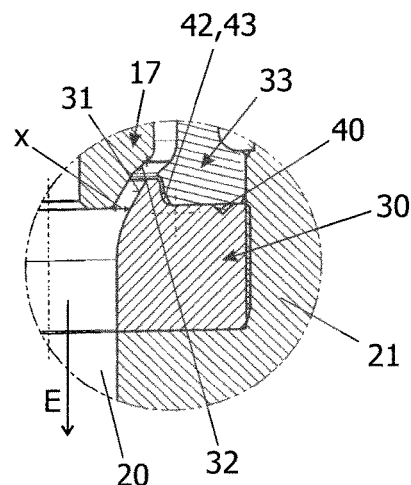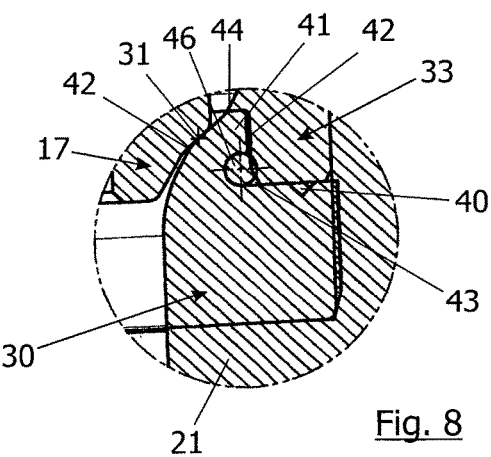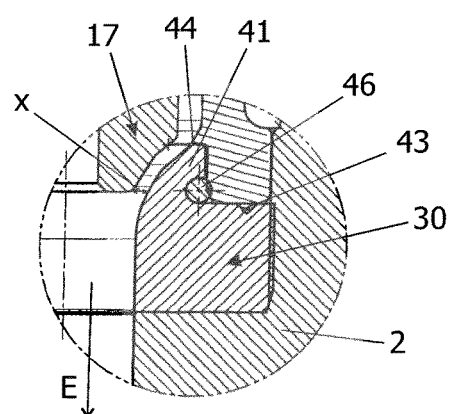

EXTRACTION VALVE

BACKGROUND AND SUMMARY OF THE INVENTION

The invention concerns an extraction valve for an overpressurized gas from a compressed gas reservoir.

Extraction valves for overpressurized gases from a compressed gas reservoir, in particular for compressed natural gas or compressed hydrogen, are known from the general state of the art. Typically, the rated pressures are in the order of magnitude of around 26 MPa for natural gas, in the order of magnitude of 70 MPa for hydrogen. Typically, the construction of such extraction valves is in the form of so-called pilot valves in which the pressure of the gas is applied via a pilot bore or a control bore, in a pressure sleeve presenting additional actuating elements of the extraction valve, as an auxiliary for opening or closing an extraction piston controlling an extraction cross-section. The extraction piston should hence be typically actuated directly or indirectly via an electromagnetic coil and is operated by the pressure building up in the pressure sleeve via the pilot bore. An exemplary extraction valve in the form of a pilot valve is described in particular in EP 1 682 801 B1.

The core, when developing such pilot valves, lies typically in the actuation system of the extraction piston via the already mentioned, mostly electromagnetic triggering and the configuration of the extraction piston and of the pilot bore. The EP document remains silent to a vast extent as regards the extraction opening properly speaking, which is designated as a valve main seat. Different requirements should still be met in this field. Good sealing, in particular when using such extraction valves in compressed gas reservoirs for hydrogen, is essential as well as high durability on the other hand so that the assembly can sustain a large number of operating cycles.

An electromagnetic extraction valve is known from US 2014/0166915 A1. To ensure good sealing between the valve body and the valve seat, a groove containing an elastic gasket is provided in the conical valve body. The assembly is critical in particular for sealing against hydrogen since high cycle stability is difficult to achieve on the one hand as well as good seal property against hydrogen on the other hand using the mentioned materials. Another similar assembly is also disclosed in US 2003/0151018 A1. The main difference lies in that in the assembly described, the sealing material is not provided in the region of the valve body but of the valve seat. The valve body properly speaking is designed as a semi-circular element so as to provide the best possible fit, ideally a linear circumferential contact line between the valve seat and the valve body. Here as well, as with hydrogen generally, good sealing effect is quite difficult to achieve. In particular in the presence of strong temperature fluctuations, as can be encountered in vehicles, the highest requirements should be set to the materials as regards their elasticity on the one hand and as regards the elasticity across a very large field of application temperatures on the other hand.

For that reason and as it is known and usual from the general state of the art, with an assembly, which seems for example comparable to the assembly shown in the last-mentioned US document, sealing elements inside the valve seat or valve body can be omitted altogether. With such assemblies, the whole valve body and/or valve seat can be made of a single material, in particular a metallic material. Such assemblies can achieve comparatively good tightness, in particular in use in compressed gas reservoirs for hydrogen. The inventor is fully aware that the assembly is highly critical in terms of wear or damage, in particular in the region of the valve seat. Since gas, for example hydrogen, is present with a rated pressure of 70 MPa on one side of a sealing edge formed between the valve seat and the valve body and after opening the extraction valve by moving the extraction piston suddenly, the gas is relaxed to a much lower pressure, for example of 20-40 MPa, the stress on the material in the region of the valve seat then becomes enormous. According to the inventor's experience, the region of the valve seat becomes extremely damaged typically after a few thousand switching cycles of the extraction piston. We assume here that the frequent sudden change in pressure ratios on the one hand and the overflow of this region with very high flow velocity immediately after opening the extraction piston on the other hand are responsible.

Another aspect is that gases in the compressed gas reservoir may often contain minimal quantities of very small abrasive particles which can lead to a kind of wear of the valve seat in cooperation with the high volume flows and velocities in the region of the valve seat. All in all, there is the danger with the assemblies known so far of insufficient tightness on the one hand and of premature damage of the valve seat due to the great number of cycles as can be the case with a pilot valve in particular, on the other hand.

It is an object of the present invention is to provide an extraction valve which is designed to ensure safe and reliable extraction of the gas stored under overpressure over a long usage time period of the extraction valve.

With the extraction valve according to the invention, the inflow chamber through which the overpressurized gas from the compressed gas reservoir flows into the extraction valve is formed totally or partially circumferentially with respect to central axis of the extraction piston. There is no direct connection to the region of the valve seat, as well with the assemblies according to the state of the art as with the extraction valve according to the invention. Far more, it is connected in the axial direction of the extraction piston against a flow direction of the gas when the extraction piston is in open position, between the valve seat and the valve body via an intermediate connection with an intermediate volume. The intermediate volume properly speaking includes a connection with the region in which the valve seat and the valve body co-operate. The overpressurized gas flowing into the extraction valve is also diverted from the inflow chamber into the opposite direction of the extraction flow downstream and reaches into the intermediate volume situated there. The intermediate volume is then connected to the region of the valve seat and the valve body so that gas is discharged between the valve seat and the valve body, from the intermediate volume through the extraction opening, when the valve is opened. The assembly thus enables incoming flow to the valve seat essentially in axial direction of the extraction valve or in axial direction parallel to the axis of the extraction piston. To do so, the mechanical stress of the valve seat is reduced significantly so that the lifetime of the valve seat can be increased, even with a large number of strokes of the extraction piston.

According to a particular advantageous further embodiment of the idea, it is also provided that the connection is formed as a central opening around the extraction piston. The intermediate volume there includes a central opening according to this advantageous further development of the extraction valve according to the invention into which gas flows accordingly so as to flow along the extraction piston in axial direction between the valve body of the extraction piston and the valve seat.

A further very advantageous embodiment of the idea moreover sets forth that the intermediate connection is designed as an annular intermediate element via several bores. Such an annular intermediate element can be mounted between the inflow chamber on the one hand and the intermediate volume on the other hand. The intermediate element is thus annular since the extraction piston runs centrally through the intermediate element. Several bores are distributed over the circumference, extending in axial direction, in the material of the annular intermediate element. Gas flows from the inflow chamber into the intermediate volume through the bores. Gas can then spread itself uniformly in the intermediate volume and flows from there ideally through the central opening of the annular intermediate element, through which the extraction piston runs, along the latter in direction of the valve seat.

In a further very favorable embodiment of the extraction valve according to the invention it is provided that the valve seat carrier is retained in the axial direction via the intermediate element. The valve seat carrier can also be retained in axial direction by the intermediate element so that a very compact assembly can be achieved, in which the annular intermediate element fulfils the functionality of the intermediate connection through the bores in axial direction against the flow direction during extraction on the one hand and the mechanical fastening of the valve seat carrier on the other hand.

The intermediate element is in a very favorable further development of the idea engaged tightly with the region of the valve seat carrier surrounding the valve seat, for which purpose the intermediate element includes a sealing edge protruding in particular in the direction of the valve seat carrier. The sealing engagement between the intermediate element and the valve seat carrier prevents the pressurized gas from flowing through possible gaps directly from the inflow chamber into the region of the valve seat. The sealing engagement can in particular be realised in such a way that a protruding sealing edge, a so-called biting edge is provided at the intermediate element, which edge is deformed when pressing the intermediate element against the valve seat carrier and/or penetrates into the material of the valve seat carrier so as to generate a reliable sealing effect.

The valve body and/or the valve seat can hence be designed as a spherical component on the one hand and as a spherical cap on the other hand. The combination between a spherical component and a conical valve seat can also be envisaged. A particular good sealing effect can be achieved when, according to a very favorable embodiment of the idea, the portion of the extraction piston used as a valve body is conical and the conical valve body co-operates with a conical valve seat whereas the opening angle of the cones of the valve body and of the valve seat depart from each other. Such a conical valve body can then co-operate ideally with the conical valve seat. Conical in the sense of the present invention should be understood as a form which can also designated as the envelope surface of a truncated cone. To do so, the term conical also encompasses in the context of the invention not only the envelope surface of a single truncated cone but also several successively connected envelope surfaces of different truncated cones with different opening angles. The truncated cone which provides the shape, can also have several axial sections of different opening angles. Such as truncated cone confers very good sealing effect, first of all if according to the idea, the conical valve body in the region of contact with the conical valve seat has a smaller or a larger opening angle of the truncated cone than the valve seat. The difference in the opening angles, departing from each other, of the truncated cones of both conical co-operating elements, valve body and valve seat, provides a substantially linear and circumferential contact of the valve body on the valve seat. The result is consequently high surface pressure which provides very good sealing effect, which proves extremely advantageous in case of hydrogen as regards the tightness of the extraction valve.

A further extraordinarily favorable embodiment of the extraction valve according to the invention can see to it that the portion of the valve seat co-operating with the valve body has a sealing lip protruding in axial direction of the intermediate volume. Such a sealing lip protruding in axial direction above the material of the valve seat carrier provides high elasticity of the valve seat in the region of the sealing lip. The result is good contact of the valve seat against the valve body and consequently a very good sealing effect.

Such a sealing lip has now the shortcoming, as shown in practice, of being comparatively sensitive. In particular the incoming flow of a large quantity of overpressurized gas as well as significant differential pressure along the sealing lip when opening the extraction valve can easily damage the sealing lip. Consequently, according to a further very favorable embodiment of the idea, it can be provided that the sealing lip lies, totally or at least partially, behind a protrusion as seen in direction of the inflowing gas during extraction. Such a protrusion can protect the sealing during the extraction cycle properly speaking of the overpressurized gas against direct incoming flow of the gas so that the protrusion shelters the sealing lip from the volume flow of the gas and therefore protects the lip mechanically. It can therefore be provided in a very advantageous further embodiment of this idea, that the protrusion is formed in the intermediate element. If the intermediate element is present according to embodiment variation of the invention described above, the protrusion can be formed ideally in the intermediate element. First of all if the intermediate element and the valve seat, which now includes the sealing lip, co-operate mechanically, for example because, as described above as a particularly advantageous further development, the intermediate element maintains the valve seat in axial direction, the assembly can provide for the protection of the sealing lip extraordinarily simply and efficiently, which increases the robustness and the lifetime of the extraction valve.

It can therefore be provided in a very advantageous further embodiment of this idea when using a sealing lip, that an activation volume is arranged around the sealing lip which is connected with the pressurized gas present at the valve body and the valve seat when the extraction piston is in closed position, in particular via a gap between the protrusion and the sealing lip. Such an activation volume on the side of the sealing lip facing away from the valve body, when the extraction piston is in closed position, results in that the comparatively elastic sealing lip is pressed in direction of the valve body due to the pressure exerted by the overpressurized gas in the region of the activation volume. The pressure of the overpressurized gas also contributes to pressing the sealing lip as firmly and hermetically against the valve body. The gas properly speaking also contributes to improving the sealing effect, hence the reason we are talking here of a pressure activation.

According to a very favorable further development of the embodiment, it can be moreover provided that the activation volume comprises a targeted connection with the region of the upcoming gas via at least one connection opening in the region of the sealing lip. Such a targeted connection, which can be formed for example as a bore through the sealing lip, as a spiral channel or as a radial groove through the sealing lip, provides very good inflow of the gas into the activation volume independently of the size of the gap between the protrusion and the sealing lip. This guarantees on the one hand reliable filling of the activation volume and hence reliable support of the sealing effect by the pressure activation. Moreover, when moving the extraction piston into the open position, it enables targeted discharge of the gas through the connection openings from the region of the activation volume. Since the comparatively sudden outflow can take place through the targeted connections safely and reliably in a predefined region and designed constructively to that effect, any possible impairments of the sealing lip caused by the outflow can be controlled much more easily than if the outflow would run along the gap over the whole region of the sealing lip or over any accidental region of the lip.

According to an additional very favorable embodiment of this idea, it can moreover be provided that a sealing material is arranged in the activation volume. A sealing material, for example a sealing ring, can be inserted extraordinarily simply and efficiently into the activation volume since the activation volume typically includes an annular chamber, situated from the central axis of the extraction valve outside the sealing lip. The sealing material has here no influence whatsoever on the sealing effect. It is advisable to reduce the volume of the activation volume only for that purpose. The remaining volume between the sealing material and the sealing lip only suffices to ensure the pressure activation described above. The inventor is fully aware that immediately after lifting the valve body from the valve seat for the first time, gas flows suddenly along the sealing lip in direction of the valve seat out of the region of the activation volume. He has observed that the flow causes an additional mechanical stress of the sealing lip, to the extent that the sealing lip is deformed. In the worst case, the sealing lip is then damaged and/or destroyed by the extraction piston or valve body during the next stroke. The improved flow according to the basic configuration of the extraction valve according to the invention, and in particular the activation volume through the sealing material, for example a very soft sealing ring, designed with a small useful filling of NBR of FKM, enable extended lifetime since on the one hand very uniform flow can be achieved and on the other hand pressure changes occurring suddenly due a comparatively sensitive sealing lip can be mitigated significantly by reducing the activation volume. A certain activation volume remains which provides an advantage in terms of sealing the extraction valve when the extraction piston is in closed position. It goes without saying that the sealing material must be suitable for the contemplated use, in particular the predefined pressure and temperature range. In particular, its glass transition temperature should be much smaller than 40° C. The sealing material should retain its elasticity over the whole temperature range. Moreover, the sealing material should be elastic and resistant against decompressive explosion.

The inflow chamber of the inlet valve according to the invention is arranged, as explained, totally or partially circumferentially around a central axis of the extraction piston and is not in fluid connection with the region of the valve seat, beyond the intermediate volume. The inflow chamber can be designed annular and in the shape of annular segments according to an advantageous further embodiment. It can hence be formed totally or partially circumferentially around the central axis of the extraction valve. According to an additional very favorable embodiment of this idea, it can moreover be provided that the inflow chamber is spiral-shaped. Such a spiral-shaped inflow chamber, in an embodiment as known for example from the inflow chamber with turbines, ensures uniform distribution of the outflowing gas through the bores in the intermediate element in direction of the intermediate volume. The result is that at the end of the day a uniform streamline-distribution of the gas in the intermediate volume and consequently uniform incident flow through the valve seat are improved so that its mechanical stress is distributed very evenly over the whole surface of the valve seat.

It can therefore be provided in a very advantageous further embodiment of this idea that the inflow chamber is connected to the volume in the compressed gas reservoir via a feed line emerging tangentially into the inflow chamber. In particular, such a tangential inflow of gas into the inflow chamber enables uniform distribution of gas in the whole inflow chamber. The danger of gas spreading into the intermediate volume and from there into the discharge opening situated in the center of the region of the valve seat, in a path preferably on the side of the inflow opening is avoided. The more uniform the flow of gas, the smaller the local stresses on the material of the valve seat and of the valve body, in particular of a sealing lip of the valve seat, in case such a sealing lip is present. Moreover, the result is a smaller pressure drop over the whole extraction path.

In a further very favorable embodiment of the extraction valve according to the invention it is moreover provided that the narrowest flowable cross-section for the gas flowing out, when the extraction piston is in open position, is arranged between the valve seat and the valve body in flow direction of the gas after the region of the valve seat, in which the seat co-operates with the valve body, when the extraction piston is in closed position. The narrowest flowable cross-section inside the extraction valve hence lies deliberately in the annular gap which is formed between the valve body and the valve seat when the extraction piston is in open position. The region of the narrowest flowable cross-section controls on the one hand the volume flow rate through the extraction valve. On the other hand, a major portion of the pressure drop and of the turbulent kinetic energy builds up between the inflow chamber on the one hand and the outflow chamber on the other hand. The materials situated in the region of the narrowest flowable cross-section are thus exposed to particularly high mechanical stress. Since the materials are then arranged in the flow direction after the region of the valve seat, which when the extraction piston is in closed position is in sealing engagement with the valve body, the region can be designed, in particular in the region of a tip of the extraction piston, which protrudes through the valve seat, in order to keep the mechanical stress away from the critical region of the valve body and valve seat.

In a further very favorable embodiment of the extraction valve according to the invention in the variation with the bores in the intermediate element, it can now be provided moreover that a guiding pin connected to the extraction piston meshes into one of the bores. First of all with a tangential inflow of gas into the inflow chamber, it can be at the end of the day the bore at which the surrounding gas arrives. The guiding pin which operates between the intermediate element and the extraction piston sees to it that the angular position of the extraction piston and hence the angular position of the valve body connected thereto remains unchanged in circumferential direction. The guiding pin also determines the angular position between the extraction piston (formed typically rotationally symmetric, with the exception of the guiding pin) and the valve seat accordingly. The fastening of the angular position enables the same regions of the valve body and of the valve seat always to co-operate. Since possible irregularities and manufacturing tolerances in the region of the valve body and of the valve seat can be corrected with increased use and the co-operation of the surfaces, the sealing effect can be improved at least after a certain useful life of the extraction valve, inasmuch as the minimal irregularities, which are unavoidable during manufacture, can compensate each other and thereby improve the sealing effect. If the extraction piston could rotate freely, different spots would always co-operate, which would deteriorate the sealing effect of the assembly.

In addition to this advantage when achieving very good sealing effect by preventing the rotation of the extraction piston by the guiding pin, the penetration of the guiding pin into one of the bores prevents the bore independently of the position of the extraction piston from being traversed by the gas, or only along a small gap between the wall of the bore and the guiding pin. One of the bores can also be prevented from conveying gas from the inflow chamber into the intermediate volume, to a vast extent. In particular, with a tangential inflow gas into the inflow chamber, gas is distributed around the whole periphery of the annular or spiral-shaped (for example) inflow chamber. In particular with an annular inflow chamber, it may happen in practice that a portion of the gas does not follow the tangential impulse but rather flows into the bore situated immediately close to the mouth of the inlet pipe. In practice, the flow could not be distributed uniformly over the individual bores. A portion of the gas would "branch off" against the desired flow direction and consequently disturb the flow of gas flowing uniformly into the intermediate volume, possibly with a slight turbulence. Since the guiding pin can now use the particularly critical bore, the constant angular position of the extraction piston with respect to the valve seat is ensured on the one hand regardless of the strokes of the extraction piston and on the other hand, the guiding pin, which penetrates into the bore at least partially in all positions of the extraction piston, blocks the particularly critical bore to a vast extent so that it cannot affect negatively the uniform flow distribution.

According to a particularly advantageous further embodiment of the extraction valve of the invention the valve seat carrier and/or the extraction piston can be formed of high performance plastic, in particular of high performance thermoplastic resin. The use of high performance plastic, such as for instance PEEK (poly ether ether ketone), PI (polyimide), PAI (polyamide imide) or another high performance plastic is particularly advantageous. The high performance plastics have a glass transition and melting temperature, which lie above the temperatures occurring usually in operation. The result is a regular and homogeneous material property in the whole temperature range in which the extraction valve is operated. Moreover, high performance plastics have a certain residual elasticity, of approx. 3%, with mechanical dimensional stability. This is sufficient to guarantee a good sealing installation between the valve seat and the valve body. Plastics can be machined quite well as required. The machining may consist for instance in injection stamping or sintering, in particular with a mechanical rectification in the region of the undercut of the sealing lip forming the activation volume. Moreover, they exhibit very good sliding properties, high resistance to abrasion and very good mechanical properties. They are therefore absolutely ideal to form the valve seat and/or the valve body according to the invention. In particular, the valve seat, if present, is formed as a single piece with the sealing lip, and enables a very simple and efficient assembly by using such high performance plastics. For instance, the valve seat can be manufactured with a sealing lip of PEEK or PI. In such a case, it would co-operate ideally with a valve seat mounted as a single-piece on the extraction piston which is made of the same material of the extraction piston, for example a steel material, such as in particular 1.4016IM, 1.4435 or SUSF316L or even of one of the high performance plastics mentioned.

As already mentioned, the extraction valve can be realised as a pilot valve, according to a particularly advantageous embodiment, whereas the assembly of the extraction valve according to the invention does not really require such as pilot valve. In particular, the described assembly of the extraction valve can also be integrated as an internal main gasket of a check valve situated in the refueling path, as used for instance in the filling path of a so-called On-Tank-Valve (OTV) or in a tank filling neck connected upstream. The assembly can also be used with a typically present second check valve, formed as a safety check valve.

The particular advantages of the extraction valve according to the invention come to the forefront in the case of a pilot valve, in particular if the pilot valve is formed for a hydrogen tank, for example an OTV on a hydrogen tank in the form of a compressed gas reservoir. The particularly good properties in terms of sealing effect on the one hand and in terms of very high cycle stability at high pressure gradients or differential pressures on the other hand present decisive advantages of the extraction valve according to the invention, which come to fruition in particular if it takes the form of a pilot valve for hydrogen tanks.

Further advantageous embodiments of the extraction valve according to the invention can be seen in the exemplary embodiments which are described more in detail below with reference to the Figures.

BRIEF DESCRIPTION OF THE DRAWINGS

FIG. 6 shows the embodiment according to FIG. 5 when the extraction piston is in open position;

FIG. 7 shows a three-dimensional sectional view of the main sealing seat and of the intermediate element in an exploded drawing of a possible section form of embodiment of the extraction valve according to the invention;

FIG. 8 shows an embodiment of the valve seat according to FIG. 7 when the extraction piston is in closed position;

FIG. 9 shows the embodiment according to FIG. 8 when the extraction piston is in open position;

DETAILED DESCRIPTION OF THE DRAWINGS

Figure 1:
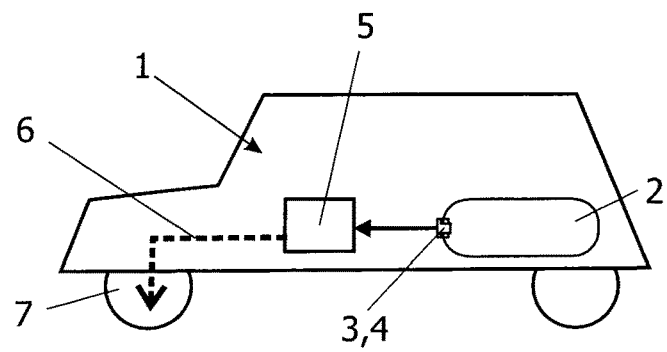
FIG. 1 shows a vehicle indicated by way of principle.

The illustration of FIG. 1 shows a vehicle 1 represented schematically. The vehicle 1 contains a compressed gas reservoir 2 which can be part of a storage system for instance for compressed natural gas or hydrogen. The compressed gas reservoir or, if several are present, each of the compressed gas reservoirs, exhibits a specified valve 3, typically a so-called On-Tank-Valve (OTV). An extraction valve 4 is part of the valve 3 for the gas stored under overpressure in the compressed gas reservoir 2. This item cannot be seen clearly in the representation of FIG. 1, but will be examined in detail at a later stage. The extracted gas reaches an energy converter 5 which can be designed by way of example as an internal combustion engine or as a fuel cell. It uses the energy stored in the gas to produce for instance mechanical energy by combustion in an engine with reciprocating pistons or for example to generate electric energy in a fuel cell out of the gas and out of the oxygen from the surrounding air. The energy flow towards one of the wheels 7 is represented purely by way of instance, via an arrow designated in dotted lines with number 6. Lastly, the gas stored in the compressed gas reservoir 2 enables to provide driving energy for the vehicle 1.

Figure 2:
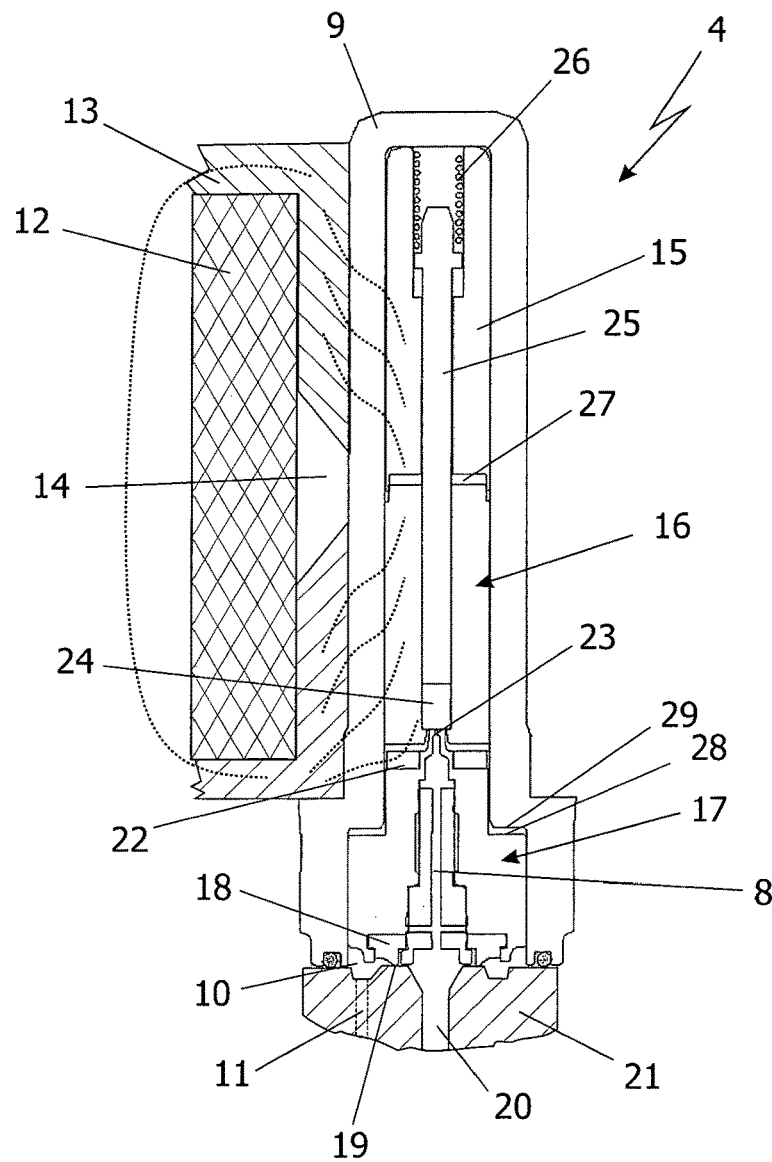
FIG. 2 shows a principle sectional view through a possible assembly of an extraction valve in the form of pilot valve.

The extraction valve 4 itself, which can be arranged in the valve 3 for instance analogically to the state of the art mentioned initially is illustrated in the representation of FIG. 2 in a first possible form of embodiment in a schematic sectional view according to the not pre-published application DE 10 2013 019 879 of the applicant in a diagrammatical sectional view. The extraction valve 4 includes thereby a pressure sleeve 9, which can be manufactured out of a non-magnetizable material, by way of example 1.4435 or SUSF316L. The so-called pressure sleeve is closed hermetically at one of its ends and, at its other end, sealed off via a gasket in the exemplary embodiment represented here, is connected to a ring-shaped chamber 10, a chamber which is linked to the inside of the compressed gas reservoir 2 via a pipe 11 represented in dotted lines. The pressure in the whole pressure sleeve 9, at least after a certain period of time, will have propagated via gaps between the inside wall of the pressure sleeve 9 and the components mounted therein. The pressure sleeve 9 is now surrounded by an electromagnetic coil 12 indicated on one side of the pressure sleeve 9. The coil 12 includes moreover a magnetizable coil yoke 13, which contains in a medium region an interruption 14 with respect to the axial length of the pressure sleeve 9. The coil 12 and the coil yoke 13 with the interruption 14 are consequently designed preferably as rotation-symmetrical or mirror-symmetrical and arranged around the pressure sleeve 9 designed as rotation-symmetrical.

The pressure sleeve 9 includes, in the representation of FIG. 2 from top to bottom, i.e., from the hermetically closed side of the pressure sleeve 9 to the open side of the pressure sleeve 9, first of all a core 15, which consists of magnetizable material, for example 1.4016IM. An anchor 16, which for example can be made of the same material, is connected to the core 15, which is pressed-in into the pressure sleeve 9. An extraction piston 17 which is composed of several parts in the exemplary embodiment illustrated here, is connected downstream to the anchor 16. It contains in the exemplary embodiment illustrated here a main gasket 18, which hermetically seals the ring-shaped inflow chamber 10 connected to the inside of the compressed gas reservoir 2, with a counter-element 19, in this case a flat surface, in a valve body, with respect to a central outflow chamber 20, a chamber 20 which is connected indirectly to the energy converting unit. The extraction piston 17 includes moreover a screwed-in central element 21 as well as on its side facing the anchor 16 a ring 22, which is designed by way of example as a permanent magnet, in particular however of magnetizable material, for instance the same material as the anchor 16 and the core 15. In this exemplary embodiment, the rest of the extraction piston 17 with the exception of the gaskets 18 can be made by way of example of a non-magnetizable material, for instance the material of the pressure sleeve 9. The region of the extraction piston 17 facing the hermetically sealed end of the pressure sleeve 9 includes moreover a pilot bore 23 which is typically designed as a bore with a very small diameter, for instance a diameter of a few 10 to a few 100 µm. It is connected to a flow opening 8 in the extraction piston 17. The pilot bore 23 is hermetically sealed via a sealing element 24 when the extraction valve 4 is sealed hermetically as represented in FIG. 2, a sealing element which is supported by a rod 25, which penetrates through the anchor 16 and the core 15, and a spring element 26 at the hermetically sealed end of the pressure sleeve 9.

The illustration of FIG. 2 shows the extraction valve 4 sealed hermetically in which the extraction piston 17 is positioned in such a way that it seals off the inflow chamber 10 with respect to the outflow chamber 20. If the coil 11 is now energized, a magnetic flow is generated in the coil yoke 13 in particular. The magnetic field lines cannot form however a closed magnetic circuit due to the gap 14 in the coil yoke 13. They will consequently migrate through the non-magnetizable material of the pressure sleeve 9 into the material of the core 15. This is represented by a few dotted lines by way of example. They endeavor to overcome an air gap 27 between the core 15 and the anchor 16 to return to the coil yoke via the anchor 16. Since the air gap 27 is smaller than the gap 14, the path of the magnetic field lines indicated is preferred. Advantageously, the air gap 27 is closed to guarantee a maximal magnetic flow. The magnetic forces consequently move the anchor 16 over the sealing element 24 and the rod 25 in a supported manner against the force of the spring element 26 in the direction of the core 15, which enables to close the air gap 27. The air gap 27, which includes a split width typically smaller than 0.7 mm when the gap is open, is closed to zero so that the anchor 16 lies immediately on the core 15. This promotes the preferred maximum possible magnetic flow.

The assembly with the sealing element 24 co-operating with the anchor 16 sees to it that on the one hand the force of the spring element 26 must be overcome when moving the anchor. On the other hand, the pilot bore 23 opens when the anchor 16 moves, since the sealing element 24 rises from the same. As already mentioned, the same pressure as in the compressed gas reservoir reigns in the inside of the pressure sleeve 9 typically, i.e., for instance when storing hydrogen at approx. 70 MPa rated pressure. As there is no pressure or a much smaller pressure in the outflow chamber 20 which leads to the energy converter 5, the gas situated in the pressure sleeve 9 is discharged via a central discharge opening in the anchor 16 and the outflow chamber 20 corresponding to the discharge opening, once the pilot bore 23 has opened. The pressure in the area of the inflow chamber 10 can be identical or also much higher than in the area of the pressure sleeve 9 above the extraction piston 17. In case of a differential pressure, the latter can promote the upward shift of the extraction piston 17 out of the position illustrated in FIG. 2, in addition to the magnetic force. With identical pressures, i.e., a zero differential pressure, the extraction piston is opened or held open only by the magnetic force. Switching operations at maximal differential pressure are in particular prevented in such a way so that the pressure is compensated solely by the actively switched pilot bore 23.

The extraction piston 17 is moved until a shoulder 28 of the extraction piston 17 strikes against a corresponding counter-stop 29 of the pressure sleeve 9 and thereby limits the lifting movement of the extraction piston 17. The main gasket 18 is then raised from its counter element 19 and releases the desired cross-section for extracting gas from the inflow chamber 10 and via the pipe 11 from the compressed gas reservoir 2 not illustrated here. Simultaneously, there will be an ingress of gas into the region of the pressure sleeve 9 along the periphery of the extraction piston 17, as well as through the pilot opening 23. The result is that the pressure ratio is compensated after a short period of time.

The coil 12 is accordingly excited to actuate the valve, i.e., to open it. A slightly larger current is typically necessary until the anchor 16 breaks away. The current can be reduced subsequently so as to hold the anchor 16 in place. The condition already described then adjusts itself. If the extraction valve 4 should be closed again, the coil 12 is switched off. The anchor 16 and the extraction piston 17 with its ring 22 made of magnetic material then come away from each other. Accordingly the pilot bore 23 is closed hermetically via the sealing element 24 by the force of the spring element 26. Consequently, the same pressure as in the region of the outflow chamber 20 adjusts itself in the region of the pressure sleeve 9 so that the closed condition illustrated in FIG. 2 is adopted due to the force of the spring element 26.

The main valve seat with the main gasket 18 and its counter-element 19 is then in the context of the not-prepublished German application mentioned previously no more relevant so that the drawings contains a main sealing seat which may not be ideal in terms of lifetime as well as in terms of sealing effect, in particular when used with hydrogen. The further developed main seat, which is the object of the present application, can now be seen in a first exemplary embodiment in the representation of FIG. 3. The valve housing 21 includes again the outflow chamber 20 as well as the inflow chamber 10. The extraction piston 17 can be seen around a central axis A, symmetrical to a vast extent. The valve housing 11 contains a valve seat carrier 30 which exhibits a conical valve seat 31, which surrounds centrally an opening connected to the outflow chamber 20. The word conical in the context of the present invention, as already explained refers to a girthed area of truncated cone or to two or several girthed areas of truncated cone, which have different opening angles connected to each other, possibly rounded in the transition region. The extraction piston 17 contains a corresponding valve body 32 which is also formed conical in the sense of the present invention. Another possibility would also be a slightly rounded cone or a spherical element with matching large radius. The angles of the cone or in the case of an spherical element the tangent in the contact region between the valve seat 31 and the valve body 32 are not the same and differ from each other. The valve body 32 has therefore preferably a smaller opening angle (for example 90°) than the cone forming the valve seat 31 (for example 100°). The result is a guaranteed linear contact of the valve body 32 and the valve seat 31, which enables very high surface pressure and consequently a very good sealing effect. The valve seat carrier 30 is to do so preferably made of high performance thermoplastic resin, for example PEEK, PI or PAI. The whole extraction piston 17 or at least the region forming the valve body 32, can be made for example of a steel material or preferably of a comparable high performance plastic. The high performance plastics have in that case the advantage of a glass transition temperature which lies above the temperatures occurring usually in operation. The result is a regular and homogeneous material property in the whole temperature range in which the extraction valve 4 is operated. Moreover, high performance plastics have a certain residual elasticity, of approx. 3%, with mechanical dimensional stability. This is sufficient to guarantee good sealing contact between the valve seat 31 and the valve body 32. The result is very good sealing of the main valve seat of the extraction valve 4, in particular at very high rated pressures and slightly volatile gases, such as for example hydrogen at a rated pressure of 70 MPa, which in practice can lead to pressures between typically 10 MPa and 105 MPa.

Figure 3:
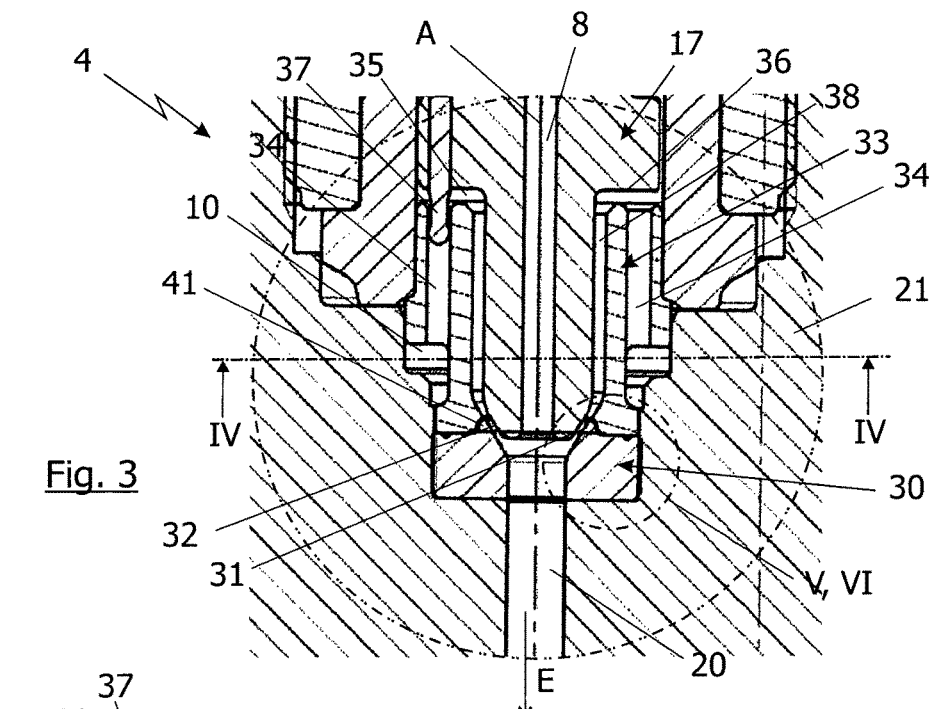
FIG. 3 shows a cut-out around the main valve seat of an extraction valve in a possible embodiment according to the invention.

The inflow chamber 10 is not connected directly to the region of the valve seat 31 in the assembly represented in FIG. 3. Far more, an intermediate element 33 is arranged between the inflow chamber 10 and the valve seat carrier 30. The intermediate element 33 rests in its lower region on the valve seat carrier 30 and fastens the carrier in direction of the axis A, hence in axial direction of the extraction valve 4. The inflow chamber 10 in the form of a circular ring in the embodiment represented here is connected to an intermediate volume 35 via several bores 34 distributed around the periphery, in the intermediate element 33 against a flow direction of hydrogen, later designated E, during extraction through the outflow chamber 20. The intermediate volume 35 lies above the intermediate element 33 between the element and a matching shoulder 35 of the extraction piston 17. The representation of FIG. 3 shows a guiding pin 37 protruding into the left-hand side bore 34 in the representation of FIG. 3. The guiding pin sees to it that the extraction piston 17, with which the guide pin 37 is rigidly connected, does not rotate in its angular position with respect to the intermediate element 33 and hence with respect to the valve seat carrier 30 held by the intermediate element 33. The result is a particularly good sealing effect after a certain operation time of the extraction valve 4 since the surfaces of the valve seat 31 and of the valve body 32 compensate each other. Since the angular position is held constant, the same regions always meet thereby achieving a particularly good and reliable sealing effect.

The gas, in this case hydrogen, is guided from the inflow chamber 10 via the bores 34 acting as an intermediate connection into the intermediate volume 35. Hydrogen is conveyed from there via a central opening 38 in the intermediate element 33 acting as a connection of the intermediate volume 35 along the lower portion of the extraction piston 17 into the region of the valve seat 31 and the valve body 32. In the position illustrated in FIG. 3, gas can flow through between the valve seat 31 and the valve body 32 and is conveyed into the outflow chamber 20, before it is discharged downwards according to the arrow designated with E.

Figure 4:
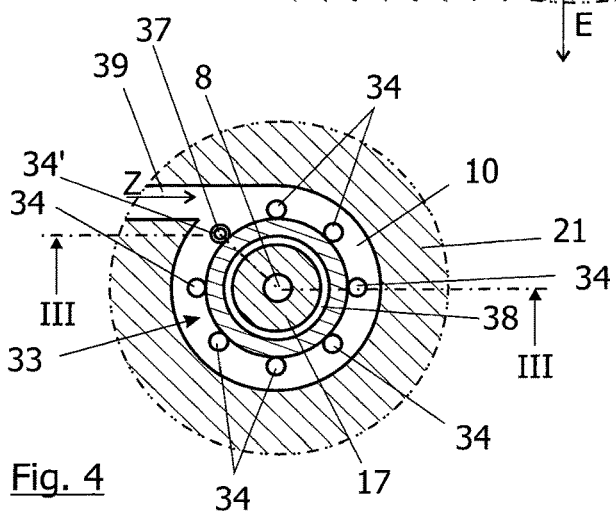
FIG. 4 shows a principle sectional view according to line IV-IV in FIG. 3.

To achieve the best possible distribution of gas in particular in the opening 38 acting as a connection in the intermediate element 33, gas flows tangentially into the inflow chamber 10 via a feed line 39 recognizable in FIG. 4, according to the arrow designated with Z. Gas is then distributed uniformly to the bores 34. The bore 34', which lies next by the feeder line 39 against the tangential incident flow, and to which gas flows tangentially and circumferentially through the inflow chamber 10 arriving there finally, includes ideally the guiding pin 37. It blocks the bore 34' at least to a vast extent. This configuration enables to prevent gas from flowing directly from the feeder pipe 39 into the intermediate volume 35 via the bore 34. The result is a very good and uniform distribution of gas to the various bores 34. As a matter of principle, a spiral-shaped embodiment enables to improve the size of the inflow chamber 10, with a cross-section tapering in flow direction. Gas is conveyed ideally via the bores 34 with a slight turbulence in the region of the intermediate volume 35. Gas flows there uniformly via the edge through the opening 38 acting as a connection downwards and along the extraction piston 17 through the gap between the valve seat 31 and the valve body 32, when the valve body 32 is open, to leave the extraction valve 4.

Figure 5:
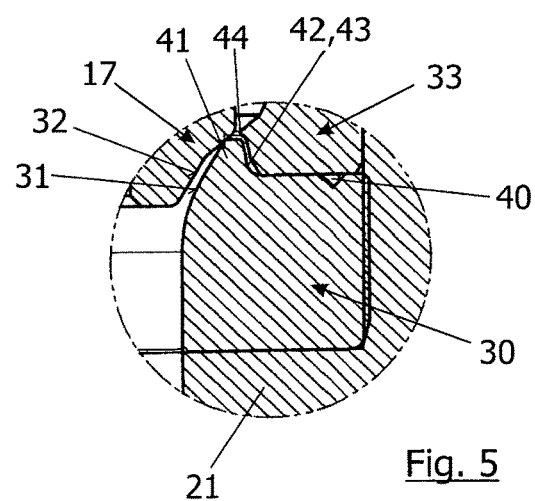
FIG. 5 shows an embodiment of the valve seat according to FIG. 3 when the extraction piston is in closed position.

The illustrations of FIGS. 5 and 6 show an enlarged cut-out from the region of the valve seat 31 and the valve body 32 in the configuration according to FIG. 3, once when the extraction piston 17 is in closed position in FIG. 5 and analogically thereto when the extraction piston 17 is in open position in FIG. 6. We can see here distinctly the particularly preferred conical embodiment of the valve body 32 of the extraction piston 17 with two girthed areas of truncated cone arranged angularly with respect to each other. The valve seat carrier 30 with the valve seat 31 is pressed in with the surrounded material of the valve body 21 and is held in place by the intermediate element 33. The intermediate element 33 has moreover a so-called biting edge which is realised as a protruding sealing edge 40. Since the intermediate element 33 consists typically of a steel material, it will press into the high performance plastic of the valve seat carrier 30 and provides a sealing effect so that gas cannot be conveyed out of the inflow chamber 10 along a possible gap between the valve housing 21 and the intermediate element 33 on the path into the region of the valve seat 31.

The valve seat 31 in the embodiment represented here includes a sealing lip 41 moreover. The sealing lip 41 protrudes above the material of the valve seat carrier 30 in the direction of the extraction piston 17. A gap designated with 42 in FIGS. 5 and 6 remains between the sealing lip 41 and the intermediate element 33. Pressurized hydrogen can penetrate into the region of an activation volume 43 around the sealing lip 41 through the gap 42, when the extraction valve 4 is in the closed state illustrated in FIG. 5. It contributes to pressing the sealing lip 41 in direction of the valve body 32 and thereby improves the sealing effect. We are then dealing with a pressure activation. To protect the sealing lip 41 against any damage caused by hydrogen having high differential pressure and high flow velocity, the intermediate element 33 includes moreover a protuberance designated with 44 in the form of embodiment represented here, which covers the sealing lip and at least the opening of the gap 42, as seen from the direction of the outflowing gas so as to prevent to a vast extent any ingress of flowing gas into the region. This enables to reduce the loud of the sealing lip 41 accordingly so that the sealing lip 41 achieves a long operating life.

The illustration of FIG. 6 shows the open position of the extraction piston 17 similarly to the illustration of FIG. 5. It can be noted that an annular gap appears between the valve seat 31 and the portion of the extraction piston 17 forming the valve body 32, a gap through which gas can be discharged into the outflow chamber designated with 20 in the extraction direction E illustrated again. In other respects, the assembly is provided comparatively to the type already explained in FIG. 5 so that all the components are not again designated with the corresponding reference signs and explained in detail.

The minimum flowable cross-section, when the extraction valve 4 is in open position, can be found in the assembly obtained in the region designated with x in FIG. 6, beneath the lower tip of the extraction piston 17 in the illustration of the Figures. The region is situated in the flow direction E of the outflowing hydrogen after the valve seat 31 properly speaking and the portion of the extraction piston 17 forming the valve body 32. Since the largest pressure reduction can be seen in the region of the narrowest cross-section, the region is exposed to very high mechanical loads. It is now of decisive advantage to place the region in the flow direction behind the valve seat 31 and the valve body 32 so that the mechanical load of the material does not jeopardize the tightness of the extraction valve 4, in view of the significant pressure drop in the region x.

The illustration of FIG. 7 shows an exploded view of a three-dimensional section through the components of the main valve seat of the extraction valve 4 in an alternative embodiment. The upper part of the Figure shows a portion of the extraction piston 17 which again includes the guiding pin 37 which is connected therewith, for example pressed in therein. The portion, again designated with 32, forming the valve body 32 can be seen in the lower region of the extraction piston 17. The valve seat carrier 30 can be seen in the illustration of FIG. 7 at the bottom. The valve seat 32 properly speaking again consists of a region which is formed conical inside a sealing lip 41 whereas the sealing lip 41, and this is here the difference with respect to the illustration of FIGS. 3 to 5, is formed otherwise. The sealing lip 41 is formed conical in the region facing the central axis A and provided with a vertical wall on the opposite side. A groove 45 in the form of a circular ring groove is arranged by way of example in the lower region to enlarge the activation volume 43 in the region and to reduce the wall thickness of the sealing lip 41. The result can be an even better pressure activation and consequently an even better sealing effect.

The intermediate element 33, which can be seen in the exploded view in the center of the assembly, is essentially analogical to the intermediate element described previously with the bores 34, which convey gas upwards from an inflow chamber 10, which cannot be seen but has a comparable assembly, in direction of the intermediate volume 35. Gas is discharged through the central opening 38 again along the extraction piston 17 in the direction of the valve seat carrier 30. A protrusion 44 is situated here in the intermediate element 33, which is also designed for protecting the sealing lip 41. As the sealing lip 41 is more sensitive in the embodiment according to FIGS. 7 to 9 through the groove 45, the sealing lip 41 is fully covered and therefore fully protecting from the incident gases thanks to the protrusion 44 according to the embodiment shown in FIGS. 7 to 9. The protrusion 44 protrudes, at the intermediate element 33 in the assembly of FIGS. 7 to 9, a little further in the direction of the extraction piston 17 than in the FIGS. 3 to 6 described previously. Otherwise, the functionality is the same to a vast extent.

The enlarged sectional view of FIG. 8 shows again the closed position of the extraction valve in an enlarged cut-out is built analogically to FIG. 5. It can be clearly seen that the protrusion 44 covers the sealing lip 41 completely. The intermediate element 33 can also include the sealing edge 40, in particular as a biting edge. The activation volume 43, which in the assembly according to FIGS. 7 to 9 is significantly smaller than with the assembly previously described, is connected again via a small gap 42 between the protrusion 44 and the material of the intermediate element 33 as well as the sealing lip 41 with the region conveying the hydrogen under pressure. The inventor is now aware that the assembly is not quite uncritical in practice since the sealing lip 41 has been damaged again. The pressure activation is admittedly better so that the sealing effect can be improved.

Damages have however proved unavoidable in the region of the sealing lip 41.

Figure 10:
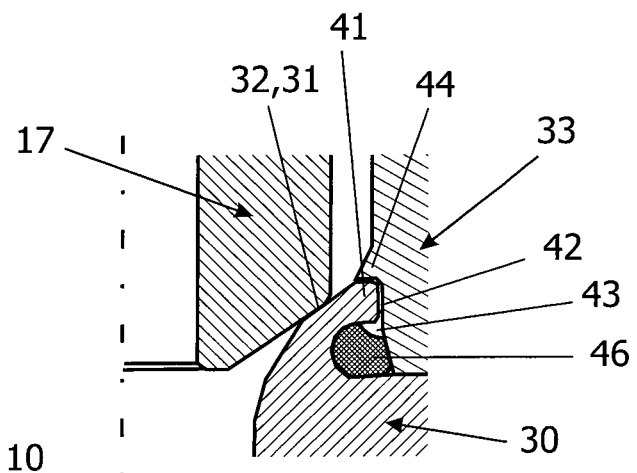
FIG. 10 shows an enlarged representation of the activation volume and of the sealing ring similar to the drawing in FIG. 8.

The inventor has recognized that obviously the size of the activation volume 43 is of vital importance. He has therefore inserted a sealing material in the form of a sealing ring 46 into the region of the activation volume 43. The sealing ring 46 consists on the one hand of an elastic material according to the situation, so that it can be mounted particularly simply, and on the other hand of a material stable to decompressive explosion. It may consist for example of NBR or FKM. The sealing ring 46 has not therefore the mission of ensuring any sealing effect. The main valve seat is fully sealed moreover between the valve body 32 and the valve seat 31. The sealing effect, with respect to an undesired inflow of gas via the gap from the inflow chamber 10 directly into the region behind the sealing lip or into the region of the activation volume, is provided by the sealing edge 40. The primary object of the seal ring 46 is to reduce the free volume inside the activation volume 43 until the gas discharged from the activation volume 43 remains uncritical for the sealing lip 41, also immediately after opening the extraction piston 17, since the quantity of gas is reduced accordingly. The seal ring 46 should therefore be very soft with a minimal useful filling, in particular a useful filling level of the ring groove of less than 65%. The free volume remaining near the seal ring 46 in the region of the activation volume 43 can accordingly be filled with gas quickly. The sealing can be improved sustainably thanks to the pressure exerted on the sealing lip 41 directly and in particular indirectly via the material of the sealing ring 46. It is represented in the illustration of FIG. 10 in an enlarged example with an accordingly deformed sealing ring 46 by the gas flowing into the activation volume 43. The sealing ring 46 hence contributes to the transmission of the compression force extensively to the side of the sealing lip 41 opposite to the valve seat 31 in order to improve the sealing effect accordingly thanks to annular elastic deformation of the sealing lip 41 in the direction of the extraction piston 17 or valve body 32.

With static conditions, as prevailing when the extraction piston 17 is in closed position, the free residual volume is sufficient for pressure activation in particular with the increased elasticity of the sealing lip 41 thanks to the groove 45. Very good results can be achieved as well as a very long operating life with the comparatively sensitive sealing lip 41 in the assembly according to FIGS. 7 to 11, with an extraordinarily good sealing of the extraction valve 4.

FIG. 9 shows again the assembly illustrated in FIG. 8, when the extraction piston 17 is in open position. We can see here again that the smallest cross-section x through which gas must flow when traversing the assembly, is arranged in the flow direction E of the discharging gas downstream of the region of the valve seat 31 and of the valve body 32 so as to achieve the advantages already described above.

Figure 11:
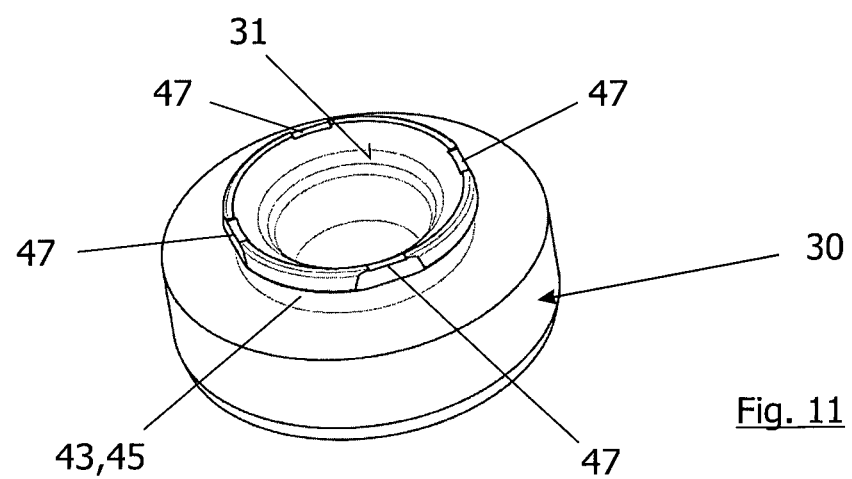
FIG. 11 shows a three-dimensional view of the valve seat carrier in an alternative form of embodiment.

For gas to reach the region of the activation volume 43 and the sealing ring 46 quite quickly and precisely on the one hand and to relieve the gas situated in the activation volume 43 during the opening cycle, quickly and precisely, without loading the sealing lip 41, on the one hand it can also be provided to mount connection openings 47 in the sealing lip 41 which can be seen in the three-dimensional representation of FIG. 11. The connection openings can be formed as notches, as shown here. It can be also envisioned to design them as bores, helical grooves or similar. They contribute on the one hand to the filling of the activation volume 43 and on the other hand to the precise (and non-hazardous for the sealing lip 41) discharge of gas out of the activation volume 43 when opening the extraction piston 17. They are therefore streamlined and arranged in such a way that they do not influence the nominal path of the flowing gas and do not generate any swirls. They can be provided in particular in the flow shadows of the protrusion 44 in the assembly described. They enable consequently quicker and more precise exchange of gas in the activation volume 43, unlike with the overflow of gas through the gap 42, described and contemplatable previously.

The invention claimed is:

1. An extraction valve for overpressurized gas flowing from a compressed gas reservoir, comprising:
 a valve seat carrier including a valve seat emerging centrally into an outflow chamber;
 an extraction piston which is mobile in an axial direction at least indirectly via an electromagnetic coil and which includes a valve body cooperating with the valve seat and an inflow chamber for pressurized gas;
 wherein the inflow chamber is formed totally or partially on a circumference of a central axis of the extraction piston and is connected, in the axial direction against a flow direction of the pressurized gas when the extraction piston is in an open position, via an intermediate connection with an intermediate volume and wherein the intermediate volume includes a connection with a region in which the valve seat and the valve body co-operate.

2. The extraction valve according to claim 1, wherein the connection is formed as a central opening around the extraction piston.

3. The extraction valve according to claim 1, wherein the intermediate connection is a plurality of bores in an annular intermediate element.

4. The extraction valve according to claim 3, wherein the valve seat carrier is retained in the axial direction via the annular intermediate element.

5. The extraction valve according to claim 3, wherein the annular intermediate element is engaged tightly with a region of the valve seat carrier surrounding the valve seat and wherein the annular intermediate element includes a sealing edge protruding in a direction of the valve seat carrier.

6. The extraction valve according to claim 1, wherein the valve body is conical and the valve seat is conical and wherein opening angles of cones of the valve body and of the valve seat depart from each other.

7. The extraction valve according to claim 1, wherein a portion of the valve seat carrier co-operating with the valve body includes a sealing lip.

8. The extraction valve according to claim 7, wherein the sealing lip lies, as seen in the flow direction, at least partially behind a protrusion.

9. The extraction valve according to claim 3, wherein a portion of the valve seat carrier co-operating with the valve body includes a sealing lip and wherein the sealing lip lies, as seen in the flow direction, at least partially behind a protrusion and wherein the protrusion is formed in the annular intermediate element.

10. The extraction valve according to claim 8, wherein an activation volume is provided around the sealing lip, wherein the activation volume is connected with the pressurized gas at the valve body and valve seat when the extraction piston is in a closed position via a gap between the protrusion and the sealing lip.

11. The extraction valve according to claim 7, wherein the sealing lip includes a connection opening.

12. The extraction valve according to claim 10, wherein a sealing material is disposed in a region of the activation volume.

13. The extraction valve according to claim 1, wherein the inflow chamber is annular or in a shape of annular segments.

14. The extraction valve according to claim 1, wherein the inflow chamber is spiral-shaped.

15. The extraction valve according to claim 1, wherein the inflow chamber is connected to a volume in the compressed gas reservoir via a feed line emerging tangentially into the inflow chamber.

16. The extraction valve according to claim 1, wherein a narrowest flowable cross-section, when the extraction piston is in the open position, is provided between the valve seat and the valve body in the flow direction after a region of the valve seat in which the valve seat co-operates with the valve body, when the extraction piston is in the closed position.

17. The extraction valve according to claim 3, wherein a guide pin connected to the extraction piston meshes into one of the plurality of bores.

18. The extraction valve according to claim 1, wherein the valve seat carrier and/or the extraction piston are formed at least in a region of the valve body of high performance plastic.

19. The extraction valve according to claim 1, wherein the extraction valve is a pilot valve for a hydrogen tank as the compressed gas reservoir.

\* \* \* \* \*